(12) United States Patent
Baker

(10) Patent No.: US 9,090,145 B2
(45) Date of Patent: Jul. 28, 2015

(54) BALANCED FLOW AIR CONDITIONING SYSTEM

(76) Inventor: Roger Baker, Solihull West Midlands (GB)

( * ) Notice: Subject to any disclaimer, the term of this patent is extended or adjusted under 35 U.S.C. 154(b) by 660 days.

(21) Appl. No.: 13/001,186

(22) PCT Filed: Jun. 26, 2009

(86) PCT No.: PCT/IB2009/052755
§ 371 (c)(1),
(2), (4) Date: Dec. 23, 2010

(87) PCT Pub. No.: WO2009/156967
PCT Pub. Date: Dec. 30, 2009

(65) Prior Publication Data
US 2011/0100034 A1    May 5, 2011

(30) Foreign Application Priority Data

Jun. 26, 2008  (GB) .................................. 0811688.1

(51) Int. Cl.
*B60H 1/00* (2006.01)
*B60H 1/24* (2006.01)

(52) U.S. Cl.
CPC .............. *B60H 1/00821* (2013.01); *B60H 1/24* (2013.01); *B60H 1/00064* (2013.01); *B60H 1/00564* (2013.01); *B60H 1/00842* (2013.01); *B60H 2001/00164* (2013.01); *B60H 2001/00192* (2013.01)

(58) Field of Classification Search
CPC .......... G60H 1/00842; G60H 1/00064; G60H 1/00021; G60H 1/00564
USPC ............................................ 62/239; 165/202
See application file for complete search history.

(56) References Cited

U.S. PATENT DOCUMENTS

| | | | |
|---|---|---|---|
| 5,280,852 A * | 1/1994 | Dauvergne | 237/12.3 A |
| 5,299,631 A * | 4/1994 | Dauvergne | 165/204 |
| 5,505,251 A * | 4/1996 | Sarbach | 165/202 |
| 6,192,698 B1 | 2/2001 | Kakehashi et al. | |
| 8,958,949 B2 * | 2/2015 | VerWoert et al. | 701/36 |
| 2002/0023448 A1 * | 2/2002 | Ito et al. | 62/222 |

(Continued)

FOREIGN PATENT DOCUMENTS

| EP | 272789 A2 * | 6/1988 |
|---|---|---|
| EP | 1607254 A2 | 12/2005 |

(Continued)

*Primary Examiner* — Ljiljana Ciric
*Assistant Examiner* — Alexis Cox
(74) *Attorney, Agent, or Firm* — Fishman Stewart Yamaguchi PLLC

(57) ABSTRACT

An air conditioning system for supplying air conditioned air to a passenger compartment of a motor vehicle has left and right hand side distribution ducts connected to a blower by a common distribution chamber. The blower causes air to flow through the common distribution chamber into the left and right hand side distribution ducts via an air conditioning unit. Each of the distribution ducts includes a distribution valve to vary the flow through the respective distribution duct and through a dump duct that exhausts air outside of the passenger compartment. Each of the dump ducts has the same resistance to flow as the respective distribution duct to which it is connected. The flow from the distribution ducts is adjusted by varying the proportion of air that flows through the cooperating dump duct without affecting the flow from the other distribution duct or requiring the blower speed to be altered.

12 Claims, 2 Drawing Sheets

(56) References Cited

U.S. PATENT DOCUMENTS

| | | |
|---|---|---|
| 2005/0082052 A1* | 4/2005 | Abdeljawad .................. 165/203 |
| 2006/0000592 A1 | 1/2006 | Bosquet et al. |
| 2009/0193830 A1* | 8/2009 | Yoshioka ........................ 62/239 |
| 2010/0043470 A1* | 2/2010 | Kang et al. ...................... 62/239 |
| 2012/0037352 A1* | 2/2012 | Osaka et al. .................. 165/202 |
| 2013/0216747 A1* | 8/2013 | Ishida .......................... 428/36.5 |

FOREIGN PATENT DOCUMENTS

| | | |
|---|---|---|
| GB | 1254593 A | 11/1971 |
| WO | WO-9722488 A1 | 6/1997 |

* cited by examiner

BALANCED FLOW AIR CONDITIONING SYSTEM

CROSS-REFERENCES TO RELATED APPLICATION

This application claims priority to United Kingdom patent application GB 0811688.1 filed on Jun. 26, 2008, and International Patent Application PCT/IB2009/052755 filed on Jun. 26, 2009, both of which are hereby incorporated by reference in their entirety.

BACKGROUND OF THE INVENTION

1. Field of the Invention

This invention relates to automotive air conditioning systems and in particular to an air conditioning system having two outlets for supplying different quantities of cooling air to left hand and right hand sides of a passenger compartment of a motor vehicle.

2. Background Art

A prior art air conditioning system 20 for a vehicle 10 is shown in FIG. 1. The air conditioning system 20 has a single fan or blower 22 to force air received from an inlet 21 into a single distribution chamber 23. A left hand distribution conduit 11L is connected to the distribution chamber 23 for supplying air conditioned air to a passenger seat on the left hand side of the motor vehicle 10 and a right hand distribution conduit 11R is connected to the distribution chamber 23 for supplying air conditioned air to a passenger seat on the right hand side of the motor vehicle 10.

It is a problem with such a system that it is not possible to provide consistent independent airflow volume to the two rear occupants. If the flow from one of the two distribution conduits 11L, 11R is turned off or the airflow is reduced then the airflow volume from the other distribution conduit 11R, 11L will increase unless the blower speed is reduced and this causes a control problem for the system because unless the flow rate through the distribution conduits 11L, 11R is constantly measured and an electronic control system is used there is no way of accurately adjusting the blower speed to return the flow through the unadjusted distribution conduit 11L or 11R to its previous level.

One solution to this problem is to separate the flows through the two distribution conduits and use separate blowers for each distribution conduit 11L, 11R but this is an expensive option and requires the separate blowers to be arranged at the outlet from the distribution chamber which is inefficient or requires separate air conditioning units to be used for each distribution conduit 11L, 11R which is expensive.

SUMMARY OF THE INVENTION

It is an object of the invention to provide an air conditioning system that is simple in construction and can supply air to two distribution conduits in a manner that enables the flow through one distribution conduit to be adjusted without significantly affecting the flow from the other distribution conduit.

According to a first aspect of the invention there is provided an air conditioning system for a motor vehicle comprising an air conditioning unit having a single blower for causing air to flow through first and second distribution conduits to a passenger compartment of the motor vehicle, each of the first and second distributions conduits being connected to the flow from the blower via a respective distribution valve used to control the flow of air through the respective distribution conduit by varying the proportion of air that flows through the respective distribution conduit and through a dump conduit also connected to the respective distribution valve wherein each dump conduit has substantially the same resistance to flow as the respective distribution conduit to which it is connected and is arranged to exhaust air outside of the passenger compartment of the motor vehicle.

The single blower may cause air to flow through a single distribution chamber to the first and second distribution conduits via the respective distribution valves.

The air conditioning unit may be located in a separate luggage compartment of the motor vehicle and each dump conduit may exhaust air into the luggage compartment.

Alternatively, the air conditioning unit may be located in the passenger compartment of the motor vehicle and each dump conduit may exhaust air outside of the motor vehicle.

Each distribution conduit may supply air to a rear passenger of the motor vehicle.

According to a second aspect of the invention there is provided a motor vehicle having an air conditioning system constructed in accordance with said first aspect of the invention.

According to a third aspect of the invention there is provided a method for varying the supply of air from one of a pair of distribution conduits connected to a single blower of an air conditioning unit without affecting the flow from the other distribution conduit wherein the method comprises providing each distribution conduit with a distribution valve to alter the proportion of flow through the respective distribution conduit and a dump conduit having the same resistance to flow as the respective distribution conduit to which it is connected via the respective distribution valve and one of increasing the flow through the dump conduit to decrease the flow through the distribution conduit and decreasing the flow through the dump conduit to increase the flow through the distribution conduit.

The sum of the air flows through each distribution conduit and its associated dump conduit may remain constant irrespective of the position of the associated distribution valve.

BRIEF DESCRIPTION OF THE DRAWINGS

The invention will now be described by way of example with reference to the accompanying drawings of which.

DETAILED DESCRIPTION

Figure 1:
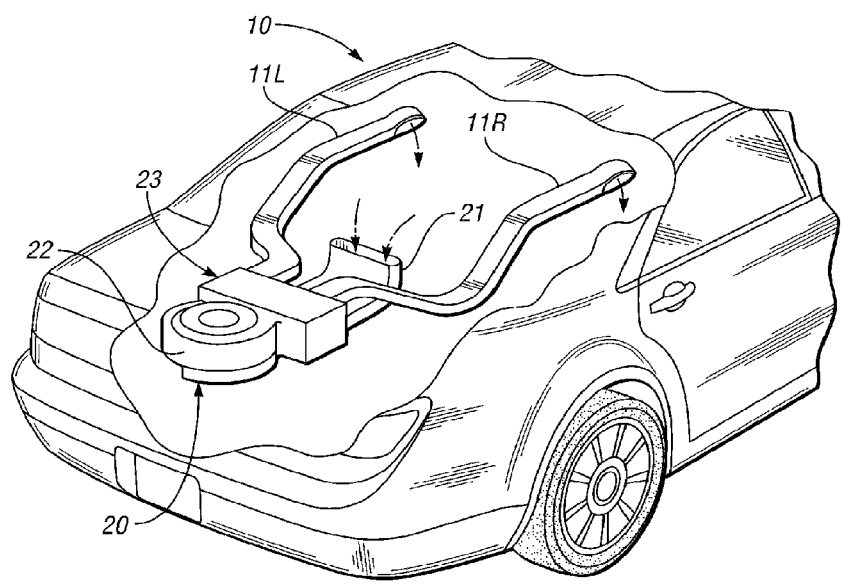
FIG. 1 shows a three quarter rear cutaway view of a vehicle fitted with a prior art air conditioning system.
Figure 2:
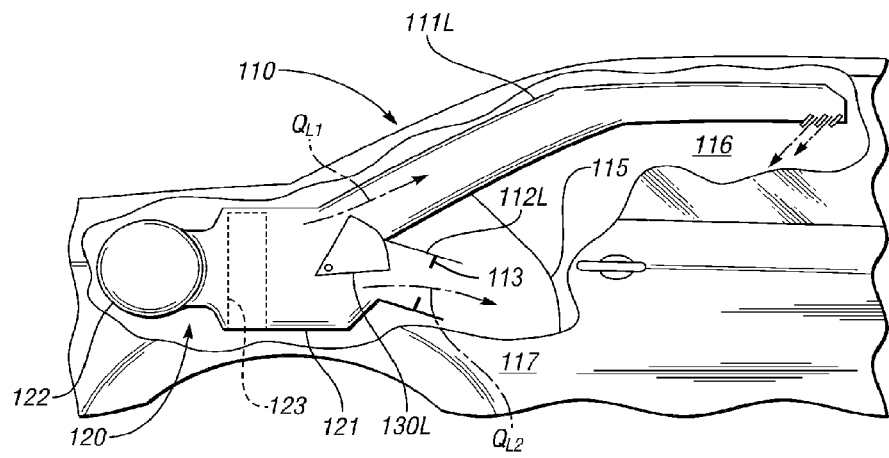
FIG. 2 shows a side cutaway view of an air conditioning system according to the invention.
Figure 3:
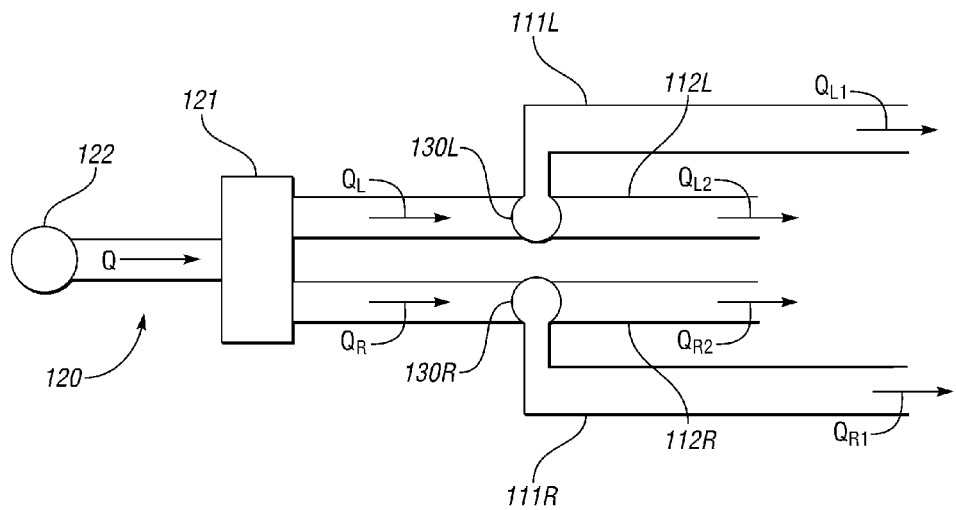
FIG. 3 is a block diagram of the air conditioning system shown in FIG. 2.

With reference to FIGS. 2 and 3 there is shown a vehicle 110 having left and right hand side distribution conduits or ducts 111L, 111R connected to a single airbox or distribution chamber 121 of an air conditioning unit 120 for supplying air to a passenger compartment 116 of the vehicle 110.

The air conditioning unit 120 also includes a single fan or blower 122 and a heat exchange unit 123 which can selectively cool the air passing through it. The air conditioning unit 120 is mounted in a separate luggage compartment 117 of the motor vehicle 110 that is separated from the passenger compartment 116 of the vehicle 110 by a bulkhead 115.

Each of the left and right hand side distribution conduits 111L and 111R is connected to the single distribution chamber 121 via a respective distribution valve 130L, 130R which in this case is formed by a quadrant valve but could be of any suitable type. A respective dump conduit 112L, 112R is connected to each of the distribution valves 130L, 130R for transporting air from the respective distribution valve 130L, 130R to a position located outside of the passenger compartment 116 and, in this case, to a position located within the separate luggage compartment 117. The air vented/exhausted through these dump conduits 112L, 112R could be used to cool electronic equipment (not shown) mounted in the luggage compartment 117.

Each of the dump conduits 112L, 112R has substantially the same resistance to air flow as the distribution conduit 111L, 111R to which it is connected via the respective distribution valves 130L, 130R. This can be achieved by using a different size conduit for the dump conduits 112L, 112R to the size of conduit used for the distribution conduits 111L, 111R or by including a restrictor 113 in each of the dump conduits 112L, 112R.

Each of the distribution valves 130L, 130R is rotatable by mechanical or electro mechanical means between two limits representing maximum flow through the distribution conduit 111L, 111R and minimum flow through the connected dump conduit 112L, 112R and minimum flow through the distribution conduit 111L, 111R and maximum flow through the connected dump conduit 112L, 112R. By changing the position of each distribution valve 130L, 130R the flow from the connected distribution conduit 111L, 111R can therefore be controlled by a passenger of the vehicle 110.

For example if less flow is required from the left distribution conduit 111L the distribution valve 130L is rotated so as to increase the flow area of the entry to the dump conduit 112L and reduce the flow area of the entry to the left distribution conduit 111L. This corresponds to an anti-clockwise rotation of the valve 130L as viewed in FIG. 2. Similarly, if more flow is required from the left distribution conduit 111L the distribution valve 130L is rotated so as to decrease the flow area of the entry to the dump conduit 112L and increase the flow area of the entry to the left distribution conduit 111L. This corresponds to a clockwise rotation of the valve 130L as viewed in FIG. 2.

The air flow through the air conditioning system is shown in FIG. 3 from which it can be seen that:

$$Q=Q_L+Q_R \quad (1)$$

$$Q_L=Q_{L1}+Q_{L2} \quad (2)$$

and $$Q_R=Q_{R1}+Q_{R2} \quad (3)$$

where:
Q=Air flow generated by blower 122;
$Q_L$=Total air flow to left side of vehicle;
$Q_R$=Total air flow to right side of vehicle;
$Q_{L1}$=Air flow through left hand side distribution conduit 111L;
$Q_{L2}$=Air flow through left hand side dump conduit 112L;
$Q_{R1}$=Air flow through right hand side distribution conduit 111R;
and
$Q_{R2}$=Air flow through right hand side dump conduit 112R Because the resistance to flow through the distribution conduits 111L, 111R is matched by the resistance to flow through the corresponding dump conduits 112L, 112R, then it will be appreciated that an increase in flow ($Q_{L1}$, $Q_{R1}$) in one of the distribution conduits 111L, 111R will be matched by a corresponding decrease in flow ($Q_{L2}$, $Q_{R2}$) in the connected dump conduits 112L, 112R but the total flow $Q_L$ and $Q_R$ will remain unchanged.

Therefore a passenger seat on one side of the vehicle 110 can increase the flow from the adjacent distribution conduit 111L or 111R without affecting the flow from the distribution conduits 111R or 111L on the opposite side of the motor vehicle 110 and without any need to adjust the speed or flow output from the blower 122.

This provides a more cost effective and less complex air conditioning system than the prior art system in which fan speed needs to be adjusted to compensate for changes in demand.

Figure 4:
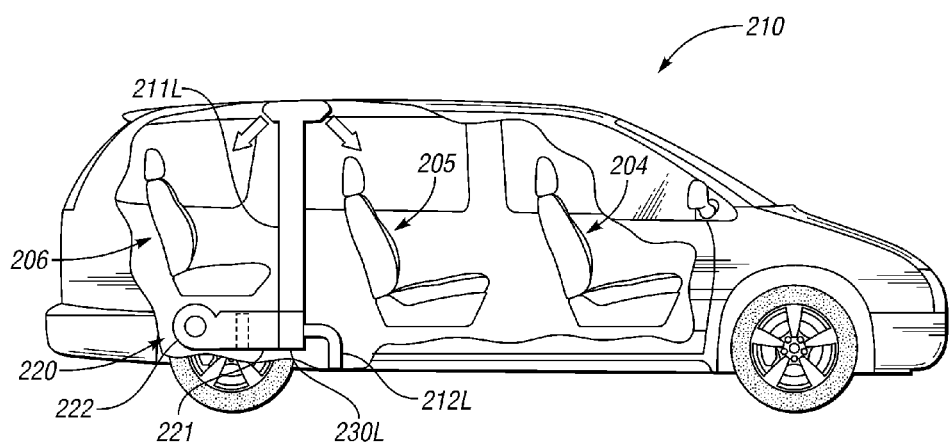
FIG. 4 a side view of a vehicle having an air conditioning system according to an alternative embodiment of the invention.

With reference to FIG. 4 there is shown a vehicle 210 having first, second and third rows of seats 204, 205 and 206 and an air conditioning unit 220 located under one of the third row 206 seats.

The air conditioning unit 220 includes a blower 222 which causes air to flow into a single distribution chamber 221 to which is connected left and right hand side distribution ducts 211L, 211R of which only the left hand side duct 211L is shown. Each of the distribution ducts 211L, 211R is connected to the single distribution chamber 221 by a respective distribution valve 230L, 230R of which only the left distribution valve 230L is shown.

The distribution valves 230L, 230R are used to vary the flow between the connected distribution duct 211L, 211R and respective dump ducts 212L, 212R of which only the left hand side dump duct 212L is shown. As before the flow resistance of the dump ducts 212L, 212R is matched to the distribution duct 1211L, 211R to which it is connected via the respective distribution valve 230L, 230R.

The air conditioning system operates as before and because of the matched flow resistances of the dump ducts 212L, 212R to their respective distribution ducts 211L, 211R the flow from one distribution duct 211L or 211R can be adjusted without affecting the flow from the opposite distribution duct 211R or 211L.

However, in this case, the air exhausted from the dump ducts 212L, 212R is exhausted to a position outside of the motor vehicle 210. It will be appreciated that the location of this exhaust flow must be positioned so as to prevent noise and noxious gas from entering the motor vehicle 210 and in a position where there are no significant pressure changes that could affect the flow through the respective dump duct 212L, 212R. For example it could exhaust behind a wheel arch liner or behind a bumper fascia.

It will be appreciated that the air conditioning unit could be mounted in various positions in a motor vehicle and could be used for example to provide individually controllable air flow to front seat occupants at low cost without the normal complexities associated with such a system.

Therefore in summary, an air conditioning system having left and right hand side distribution ducts is disclosed in which the airflow to each side is controlled with a distribution valve such as a quadrant valve or a pair of flaps that progressively open and close to direct the airflow either into the distribution duct or to a dump duct tuned to have a similar air pressure drop as the distribution duct to which it is connected. This permits the airflow to be adjusted on one side of the vehicle without affecting the unadjusted side or needing to change the blower speed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. An air conditioning system for a motor vehicle having a passenger compartment, the air conditioning system comprising:
   an air conditioning unit having a single blower for causing air to flow;
   a first air flow conduit through which a variable first air flow is flowable from the single blower, and a second air flow conduit through which a variable second air flow is flowable from the single blower, the first air flow conduit and the second air flow conduit being fluidly in parallel;
   a first distribution conduit through which a first portion of the first air flow is flowable to the passenger compartment, and a first dump conduit through which a second portion of the first air flow is flowable to a trunk space outside of the passenger compartment;
   a second distribution conduit through which a first portion of the second air flow is flowable to the passenger compartment, and a second dump conduit through which a second portion of the second air flow is flowable to the trunk space;
   a first distribution valve connecting the first air flow conduit to the first distribution conduit and the first dump conduit, the first distribution valve being configured to inversely vary the first portion of the first air flow flowing through the first distribution conduit, and the second portion of the first air flow flowing through the first dump conduit; and
   a second distribution valve connecting the second air flow conduit to the second distribution conduit and the second dump conduit, the second distribution valve being configured to inversely vary the first portion of the second air flow flowing through the second distribution conduit, and the second portion of the second air flow flowing through the second dump conduit;
   wherein the first dump conduit has a flow resistance the same as a flow resistance of the first distribution conduit, and the second dump conduit has a flow resistance the same as a flow resistance of the second distribution conduit.

2. The air conditioning system of claim 1 wherein the air conditioning unit further includes a single distribution chamber to which the first air flow conduit and the second air flow conduit are connected, and through which the single blower is configured to cause the first air flow to flow into the first air flow conduit, and the second air flow to flow into the second air flow conduit.

3. The air conditioning system of claim 1 wherein the air conditioning unit is located outside of the passenger compartment of the motor vehicle.

4. The air conditioning system of claim 1 wherein the air conditioning unit is located in the passenger compartment of the motor vehicle, the first dump conduit is configured to further exhaust the second portion of the first air flow outside of the motor vehicle, and the second dump conduit is configured to further exhaust the second portion of the second air flow outside of the motor vehicle.

5. The air conditioning system of claim 1 wherein the first distribution valve is configured to operate without affecting the second air flow, and the second distribution valve is configured to operate without affecting the first air flow.

6. A method for providing air from an air conditioning unit to a passenger compartment of a motor vehicle, the method comprising:
   causing, by a single blower, air to flow in an air flow;
   dividing the air flow into a first air flow through a first air flow conduit, and a second air flow through a second air flow conduit;
   causing, by a first distribution valve, a first portion of the first air flow to flow through a first distribution conduit to the passenger compartment, and a second portion of the first air flow to flow through a first dump conduit to a trunk space outside of the passenger compartment;
   causing, by a second distribution valve, a first portion of the second air flow to flow through a second distribution conduit to the passenger compartment, and a second portion of the second air flow to flow through a second dump conduit to the trunk space; and at least one of:
      changing a position of the first distribution valve to reduce one of the first portion and the second portion of the first air flow, and to simultaneously increase the other of the first portion and the second portion of the first air flow; and
      changing a position of the second distribution valve to reduce one of the first portion and the second portion of the second air flow, and to simultaneously increase the other of the first portion and the second portion of the second air flow.

7. The method of claim 6 wherein the sum of a volume of the first portion of the first air flow in the first distribution conduit and a volume of the second portion of the first air flow in the first dump conduit is constant irrespective of the position of the first distribution valve, and the sum of a volume of the first portion of the second air flow in the second distribution conduit and a volume of the second portion of the second air flow in the second dump conduit is constant irrespective of the position of the second distribution valve.

8. A vehicle comprising a passenger compartment, a trunk space outside of the passenger compartment, and an air conditioning system having:
   an air conditioning unit having a single blower for causing air to flow;
   a first air flow conduit through which a variable first air flow is flowable, and a second air flow conduit through which a variable second air flow is flowable;
   a first distribution conduit through which a first portion of the first air flow is flowable to the passenger compartment, and a first dump conduit through which a second portion of the first air flow is flowable to the trunk space;
   a second distribution conduit through which a first portion of the second air flow is flowable to the passenger compartment, and a second dump conduit through which a second portion of the second air flow is flowable to the trunk space;
   a first distribution valve connecting the first air flow conduit to the first distribution conduit and the first dump conduit, the first distribution valve being configured to inversely vary the first portion of the first air flow flowing through the first distribution conduit, and the second portion of the first air flow flowing through the first dump conduit; and
   a second distribution valve connecting the second air flow conduit to the second distribution conduit and the second dump conduit, the second distribution valve being configured to inversely vary the first portion of the second air flow flowing through the second distribution conduit, and the second portion of the second air flow flowing through the second dump conduit;

wherein the first dump conduit has a flow resistance the same as a flow resistance of the first distribution conduit, and the second dump conduit has a flow resistance the same as a flow resistance of the second distribution conduit.

9. The vehicle of claim 8 wherein the air conditioning unit further includes a single distribution chamber to which the first air flow conduit and the second air flow conduit are connected, and through which the single blower is configured to cause the first air flow to flow into the first air flow conduit, and the second air flow to flow into the second air flow conduit.

10. The vehicle of claim 8 wherein the air conditioning unit is located outside of the passenger compartment.

11. The vehicle of claim 8 wherein the air conditioning unit is located in the passenger compartment, and the first dump conduit is configured to further exhaust the second portion of the first air flow outside of the vehicle, and the second dump conduit is configured to further exhaust the second portion of the second air flow outside of the vehicle.

12. The vehicle of claim 8 wherein the first distribution valve is configured to operate without affecting the second air flow, and the second distribution valve is configured to operate without affecting the first air flow.

* * * * *